(12) United States Patent
Branson et al.

(10) Patent No.: US 6,314,512 B1
(45) Date of Patent: Nov. 6, 2001

(54) AUTOMATIC NOTIFICATION OF CONNECTION OR SYSTEM FAILURE IN ASYNCHRONOUS MULTI-TIERED SYSTEM BY MONITORING CONNECTION STATUS USING CONNECTION OBJECTS

(75) Inventors: Michael J. Branson; Steven G. Halverson; Andrew J. Streit; Devaughn L. Rackham; Susette M. Townsend, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/112,352

(22) Filed: Jul. 9, 1998

(51) Int. Cl.[7] .................................................. G06F 11/30
(52) U.S. Cl. ................................. 712/224; 712/227; 714/4
(58) Field of Search ................................. 709/224, 227; 714/4

(56) References Cited

U.S. PATENT DOCUMENTS 6,016,500 * 1/2000 Waldo et al. ......................... 707/202
6,018,805 * 1/2000 Ma et al. .................................. 714/4
6,021,437 * 2/2000 Chen et al. ........................... 709/224
6,021,507 * 2/2000 Chen ........................................ 714/2

OTHER PUBLICATIONS

Branson, et al., U.S. Patent Application Ser. No. 09/112,353, filed Jul. 9, 1998.

* cited by examiner

Primary Examiner—Kenneth S. Kim
(74) Attorney, Agent, or Firm—Christopher H. Lynt; Matthew J. Bussan

(57) ABSTRACT

Detection of a failure in a multi-system application, includes detecting a first message between a first system and a second system and creating a connection object representing a connection between the first system and the second system. Thereafter, connection status is monitored with the connection object to detect a connection or system failure. The same connection object is used for all subsequent messages between the first system and the second system. The multi-system application uses service objects on the first and the second system, and when a connection or system failure is detected, failure handling is initiated, including notifying all service objects of the failure.

20 Claims, 3 Drawing Sheets

AUTOMATIC NOTIFICATION OF CONNECTION OR SYSTEM FAILURE IN ASYNCHRONOUS MULTI-TIERED SYSTEM BY MONITORING CONNECTION STATUS USING CONNECTION OBJECTS

CROSS-REFERENCE TO RELATED APPLICATIONS

This application is related to the applicants' application Ser. No. 09/112,353, filed Jul. 9, 1998, entitled "MECHANISM FOR ROUTING ASYNCHRONOUS STATE CHANGES IN A 3-TIER APPLICATION", U.S. Pat. No. 6,175,876.

BACKGROUND OF THE INVENTION

1. Field of The Invention

The invention relates to the field of multi-process systems, e.g., computer networks, and in particular, to system failure detection and notification in an asynchronous processing environment.

2. Background Information

Multi-processing systems are known, such as computer networks, and application programs may utilize resources which are distributed among the systems, e.g., a database located on a remote computer on the network may be accessed by an application program started by through an end user interface on a personal computer (PC). Such an application program will be referred to herein generically as a network application.

System failures may result from any number of causes, for example, a computer or process abending (abnormal ending of a task, e.g., crashing), losing communications, or because of a reboot.

In network applications, it is important to detect any system failure in a timely fashion in order to provide feedback to a user at the end user interface. In particular, if a user at an end user interface has commanded an operation that is destined to fail because of such a system failure, it is important to update the end user interface with that information as soon as possible so as not to waste the time of the user.

It is further important to detect the failure in a timely fashion in order to take corrective action within the network application. If corrective action is possible, it should be taken without a long delay so as not to delay the processing of the application.

It is also important to detect the failure in a timely fashion in order to clean up resources on other systems in the network that are dependent upon the failed system. Failed operations continue to consume resources until the failure is detected and the resources are released. In a network application, these resources often exist on other systems than the failed system which are involved in the processing of the operation that has failed.

In a synchronous processing environment, system failure is typically detected when an operation is initiated on that system and the system fails to respond. Detection of the failure is thus delayed until such an operation is attempted.

However, in an asynchronous processing environment detection is not as simple as in the synchronous environment. An operation could result in system A and system B sending multiple messages to one another in an asynchronous fashion. At any point in time, it may be just as correct for one of the systems to send a message to the other as it is for one of the systems to never have to send a message to the other. The lack of messages flowing between the systems is therefore not necessarily a valid indicator of failure. The messages may be sporadic, or they may never have to occur. So in the asynchronous case, a long-running operation may continue to appear normal, even though a system has already failed.

While system failure could be detected when the next operation involving the failed system is initiated, that operation might not be initiated until minutes, hours or even days after the system has failure has occurred.

A need therefore exists for system failure detection in the asynchronous processing environment which is virtually immediate, thus solving the problems related to not having notification of a system failure in a timely fashion.

SUMMARY OF THE INVENTION

It is, therefore, a principal object of this invention to provide a method and system for automatic detection and notification of system failure in a multi-system, e.g., network, application.

It is another object of the invention to provide a method and apparatus that solves the above mentioned problems so that system failure is detected immediately upon occurrence and notification given in a timely fashion.

These and other objects of the present invention are accomplished by the method and apparatus disclosed herein.

Advantageously, the present invention solves the problem of detecting in a timely fashion that a system involved in a network application has failed. According to an aspect of the invention, detection of the system failure is virtually immediate.

According to another aspect of the invention, the first time that a message needs to be sent between a network server and another system which performs distributed operations, a connection object is created by a respective connection manager on both the server and the other system to represent the communication connection.

According to another aspect of the invention, the respective connection manager controls and tracks the respective system's active connections.

According to another aspect of the invention, any subsequent messages between the respective systems will use the same connection object.

According to another aspect of the invention, a separate thread owned by the respective connection manager monitors the status of the connection.

According to another aspect of the invention, when there is a communication failure, the connection manager detects it immediately.

According to another aspect of the invention, the connection manager then sends a message which causes an update message to be sent to all service objects that exist notifying them of the system failure. Operations in the network application utilize service objects and their corresponding proxies that exist on the systems involved in the operation. A "service object" is a bundle of data and function for performing a particular service, and a proxy is a stand-in on one system for a corresponding object on another system.

According to another aspect of the invention, the service objects may then notify the end-user that the system has partially or completely failed.

According to another aspect of the invention, clean-up operations may be started, or other corrective action may be taken.

According to another aspect of the invention, all messages from the time of the failure through the handling of the failure are sent asynchronously so that other application operations are not severely impacted.

According to another aspect of the invention, failure handling is advantageously initiated when the failure occurs, i.e., there is no waiting for a next message to be sent across the connection to determine that a failure has occurred.

These and other aspects of the invention will become apparent from the detailed description set forth below.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

The invention will be described in the context of a three-tiered network environment, however, the invention is not necessarily limited thereto. In a classical three-tiered network, there is a presentation logic (PL) tier, a business logic (BL) tier, and a data logic (DL) tier. The presentation logic tier, tier one, is the so-called front end of the application. This is the graphical user interface (GUI) that collects data from the user and displays information for the user. Its purpose is to interact with the end user and to request services from one or more servers and/or host systems.

The business logic tier, tier two, is usually running on a server. It processes data on behalf of the PL client and may require the services of other BL's residing on the same or other machines.

The data logic tier, tier three, is usually a host program which obtains data requested by either a BL or PL from a database.

Figure 1:
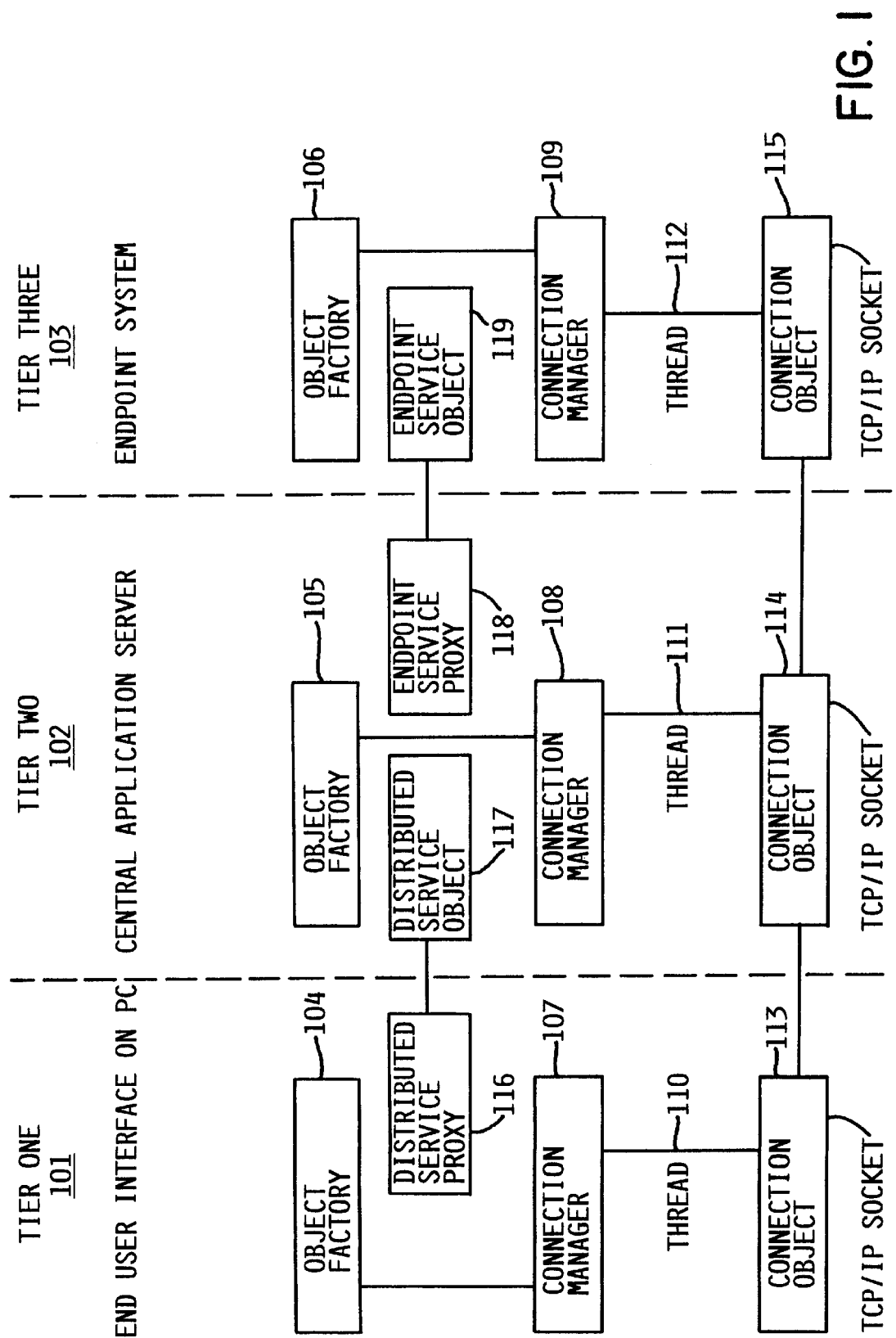
FIG. 1 illustrates a three-tier network application environment according to an exemplary embodiment of the present invention.

The network application environment illustrated in FIG. 1 has 3 tiers 101, 102 and 103. The first tier labeled TIER ONE 101, is the presentation logic (PL) tier, and represents an end user interface on a PC.

The second tier labeled TIER TWO 102, is the business logic (BL) tier, and represents a central application server associated with the end user that drives the majority of the application logic. However, there could be more than one server, as explained above.

The third tier labeled TIER THREE 103, is the data logic (DL) tier, and represents other systems, called endpoint systems, that the central application server of the second tier 102 deals with to perform distributed operations. One of these endpoint systems is illustrated in this 3-tier model. There could be any number of other endpoint systems in tier three 103.

All operations in the network application utilize service objects, e.g., 117 and 119, and their corresponding proxies, e.g., 116 and 118, that exist on the systems involved in the operation. A "service object" is a bundle of data and function for performing a particular service, and a proxy is a stand-in on one system for a corresponding object on another system. All service objects are created through an "Object Factory" object, e.g., 104, 105 and 106, which keeps track of all the existing service objects on the particular system. The Object Factory is a control point for creating objects in the system.

When a user action requires an operation to be performed in the network, the systems, e.g., the central application server of the second tier 102 and the endpoint system of the third tier 103, may need to communicate with one another to accomplish the operation. The first time that a message needs to be sent between systems, e.g., the central server of the second tier 102 and an endpoint system of the third tier 103, a connection object, e.g., 114 and 115, is created on both systems to represent this. A connection object is an object which handles communications between the systems.

A connection manager object, e.g., 107, 108 and 109, exists on each of the systems to control and track that system's active connections. The connection manager object knows about all connections, i.e., connection objects, from the system it is on to another system.

Any subsequent messages between the respective systems will use the same connection object. As stated in the problem description in the Background section above, the communication between the central application server and the endpoint systems, for example, occurs in an asynchronous fashion, and it is often impossible to determine when all the messages necessary for a particular operation are done.

For example, if the operation is to monitor the status of a device on an endpoint system, and that device never changes state, no messages will need to be sent from the endpoint system to the central application server. If, on the other hand, the device frequently changes state, a set of messages will need to be sent between the endpoint system and the central application server every time this occurs.

A connection object is most often associated with a network communication application program interface, for example, a TCP/IP (Transmission Control Protocol/Internet Protocol) socket connection between systems. However, other types of connections can also be handled by the invention. A separate thread, e.g., 110, 111 and 112, owned by the respective connection manager 107, 108 and 109, monitors the status of the TCP/IP socket connection. A thread is defined as the smallest unit of operation (task) to be performed within a process.

When a TCP/IP socket "drops" due to system or communications failure, for example, the respective connection manager detects it immediately. The connection manager will then send a message to the Object Factory on the same system where that connection manager is running. The Object Factory sends a special update message to all of the service objects that exist to notify them of the system failure.

The service objects may implement a handler for this update message to take an action when a system fails. For some service objects, this means immediate notification to the end-user that their operation has partially or completely failed. It may also mean that cleanup needs to occur or corrective action needs to be taken.

All messages from the time of failure through the handling of the failure are sent asynchronously so that other application operations are not severely impacted. That is, other application operations are not interrupted to take care of the failure and the failure notification is not delayed until the application operation terminates. Rather, the failure notification is sent immediately and may be queued by the respective system until an appropriate time.

This solution according to the invention initiates the handling of the failure immediately when the system or communications failure occurs. That is, it does not wait until the next message is sent (or attempted to be sent) across a connection to determine that a failure has occurred.

The solution according to the present invention thereby addresses the asynchronous communication aspect the problem, and provides notification of the failure in a timely fashion.

The invention has applicability to virtually any network or multi-processing application.

Figure 2:
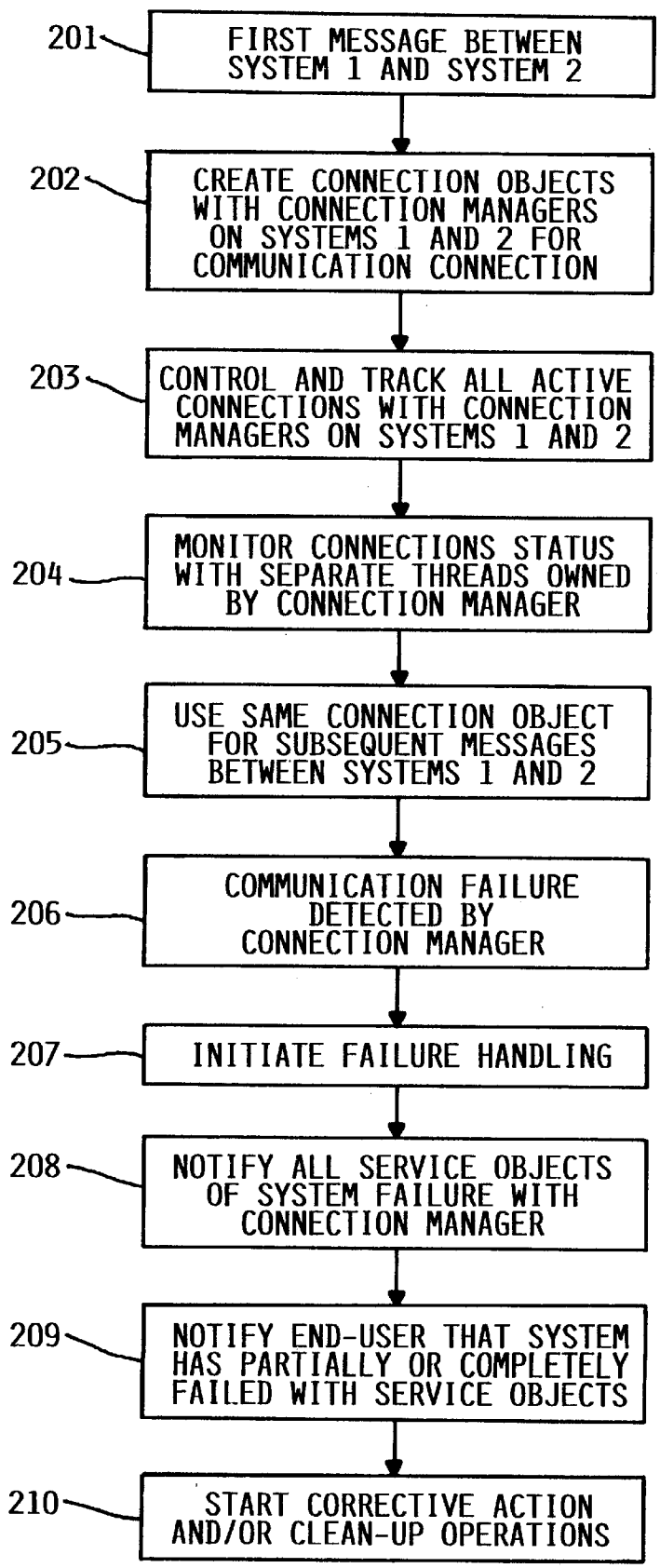
FIG. 2 illustrates a flow chart of a method according to an exemplary embodiment of the invention.

The flow chart of FIG. 2 shows exemplary steps to implement the invention according to one embodiment. The illustrated method detects a first message between system 1 and system 2 at step 201. Then the method will create connection objects with the connection managers on systems 1 and 2 to establish the communication connection at step 202. The method will control and track all active connections with the respective connection managers on systems 1 and 2 at step 203. This will monitor the connections status with separate threads owned by a respective connection manager at step 204. The same connection object will be used for subsequent messages between systems 1 and 2 as indicated at step 205. The method continues until a communication failure is detected by the connection manager at step 206. Then the method will immediately initiate failure handling at step 207. The failure handling includes notifying all service objects of the system failure with the connection manager at step 208. This would also include notifying the end-user that the system has partially or completely failed with the service objects at step 209. Then, the method may proceed to start corrective action and/or clean-up operations at step 210.

Figure 3:
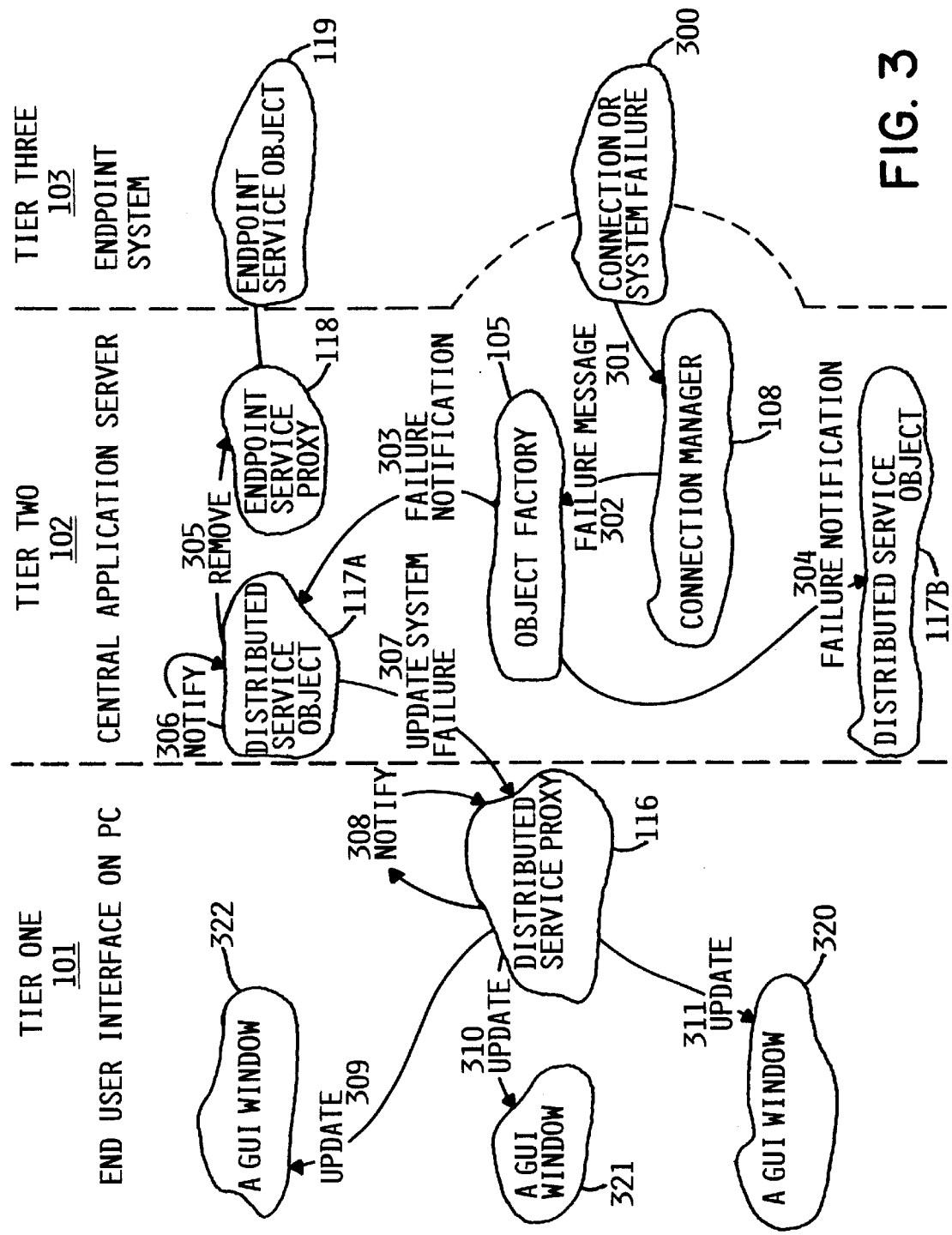
FIG. 3 illustrates an exemplary failure notification in a three-tiered system according to an exemplary embodiment of the invention.

FIG. 3 is an object-interact diagram, also referred to as a bubble diagram, illustrating an example of a failure in tier three 103, where two separate and unique distributed service objects 117A and 117B are notified. Distributed service object 117A is shown performing some cleanup and notifying the end user interface in tier one 101. In more detail, a connection or system failure 300 affecting endpoint service object 119 and its endpoint service proxy 118, for example, in tiers two 102 and three 103, respectively, is detected by connection manager 108 as indicated by line 301. Although the failure 300 is shown between tiers two 120 and three 103, it should be understood that a connection failure between a proxy and its corresponding object could occur in other configurations and the invention is not necessarily limited to only detecting failures between tiers two 102 and three 103 in a three tiered network such as that shown in FIG. 3.

The connection manager 108 issues a failure message to the object factory 105, indicated by line 302. The object factory 105 issues a failure notification, indicated by lines 303 and 304, to distributed service objects 117A and 117B, respectively. Distributed service object 117A performs some clean-up, i.e., removing an affected (by the failure) endpoint service proxy 118, as indicated by line 305. Distributed service object 117A also notifies the end user as indicated by line 306 and issues an update system failure, line 307, to distributed service proxy 116. Distributed service proxy 116 performs a notification, line 308, issuing a respective update 309, 310 and 311, to the graphical user interfaces (GUI's) 322, 321 and 320, respectively.

While described in the context of a three-tiered network environment, the invention is not limited thereto. One skilled in the art would recognize that the invention would be applicable to any number of multi-processing arrangements where failure notification is important.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

What is claimed is:

1. A method of detection of a failure in a multi-system implemented application in an asynchronous processing system, comprising:

detecting a first message between a first system and a second system;

creating a respective connection object on each system representing a connection between the first system and the second system; and monitoring connection status with the respective connection objects to immediately detect a connection or system failure.

2. The method according to claim 1, wherein the first system is a network server and the second system is an endpoint system, the method further comprising:

using the same respective connection object for all subsequent messages between the network server and the endpoint system.

3. The method according to claim 1, wherein the multi-system application uses service objects on the first system and corresponding service proxies on the second system, and wherein when a system or connection failure is detected, the method further comprises:

initiating failure handling, including notifying all service objects of the failure and, if appropriate, optionally removing any proxies affected by the failure.

4. The method according to claim 3, wherein the failure handling further comprises:

starting corrective action and/or clean-up operations.

5. The method according to claim 1, wherein the multi-system application operates in a three-tiered environment including a presentation logic tier having an end user interface, a business logic tier having an application server, and a data logic tier having an endpoint system, the first system being the application server, and the second system being the end user interface, the method further comprising:

detecting a message between the second system and the endpoint system;

creating second respective connection objects on the second system and the endpoint system representing a connection between the second system and the endpoint system; and monitoring connection status with the respective second connection objects to detect a connection or system failure.

6. The method according to claim 5, wherein each of the connection objects include a Transaction Control Protocol/Internet Protocol socket.

7. The method according to claim 5, wherein each of the first system, the second system and the endpoint system include a respective connection manager object having a respective thread, the method further comprising monitoring the connection status of the respective connection object with the respective thread.

8. The method according to claim 5, further comprising using the same respective connection objects for all subsequent messages between the first system and the second system, and between the second system and the endpoint system.

9. The method according to claim 5, further comprising initiating failure handling when a system failure is detected.

10. The method according to claim 9, wherein the multi-system application uses service objects and corresponding service proxies, and wherein the failure handling comprises issuing a failure notification to the service objects.

11. The method according to claim 10, wherein the failure handling further comprises:

performing a clean-up operation.

12. The method according to claim 11, wherein the clean-up operation comprises:

removing a service proxy affected by the failure.

13. The method according to claim 11, wherein the failure handling further comprises notifying end users of the occurrence of the failure.

14. In a three-tiered network, a first tier having an end user interface system, a second tier having a central application server system, and a third tier having at least one endpoint system, the three-tiered network implementing a network application utilizing object-oriented programming, in an asynchronous processing system a method comprising:

creating respective connection objects on each system which handle communications between the end user interface, the central application server and the at least one endpoint system, required by the network application;

monitoring each of the respective connection objects to immediately detect a connection or system failure; and upon detection of a connection or system failure, performing failure handling on each respective system.

15. The method according to claim 14, wherein the failure handling comprises issuing a notification to an end user of the network application.

16. The method according to claim 15, wherein the failure handling further comprises performing a clean-up operation.

17. The method according to claim 16, wherein the respective systems use service objects and service proxies, and wherein the cleanup comprises removing service proxies affected by the failure.

18. The method according to claim 14, wherein the failure handling comprises issuing failure notification messages and handling the failure messages asynchronously.

19. The method according to claim 18, wherein all messages issued from the time of detection of the failure through the failure handling are sent asynchronously so that network application operations unrelated to the failure are not interrupted to take care of the failure and the failure notification is not delayed until the application operation terminates.

20. The method according to claim 19, wherein the failure notification is sent immediately and can be queued by a respective system until an appropriate time for processing.

* * * * *